(12) United States Patent  (10) Patent No.: US 8,833,781 B2
Hayes  (45) Date of Patent: Sep. 16, 2014

(54) ROBUST ROCKER GUARD WITH AUTOMATIC STEP

(75) Inventor: Mark David Hayes, Hyde Park, UT (US)

(73) Assignee: Rock-Slide Engineering LLC, North Logan, UT (US)

(*) Notice: Subject to any disclaimer, the term of this patent is extended or adjusted under 35 U.S.C. 154(b) by 425 days.

(21) Appl. No.: 12/917,494

(22) Filed: Nov. 2, 2010

(65) Prior Publication Data

US 2012/0104719 A1  May 3, 2012

(51) Int. Cl.
*B60R 3/02* (2006.01)

(52) U.S. Cl.
CPC .......................................... *B60R 3/02* (2013.01)
USPC ........................................... 280/163; 280/166

(58) Field of Classification Search
USPC .................................................. 280/166, 163
See application file for complete search history.

(56) References Cited

U.S. PATENT DOCUMENTS

| | | | |
|---|---|---|---|
| 6,135,472 A * | 10/2000 | Wilson et al. ................. | 280/166 |
| 6,612,596 B2 * | 9/2003 | Jeon et al. .................... | 280/166 |
| 6,641,158 B2 * | 11/2003 | Leitner ......................... | 280/166 |
| 6,830,257 B2 * | 12/2004 | Leitner ......................... | 280/166 |
| 6,926,295 B2 * | 8/2005 | Berkebile et al. ............. | 280/166 |
| 6,938,909 B2 * | 9/2005 | Leitner ......................... | 280/166 |
| 6,942,233 B2 * | 9/2005 | Leitner et al. ................. | 280/166 |
| 6,955,370 B2 * | 10/2005 | Fabiano et al. ............... | 280/163 |
| 7,007,961 B2 * | 3/2006 | Leitner et al. ................. | 280/166 |
| 7,017,927 B2 * | 3/2006 | Henderson et al. ........... | 280/166 |
| 7,055,839 B2 * | 6/2006 | Leitner ......................... | 280/166 |
| 7,118,120 B2 * | 10/2006 | Lee et al. ...................... | 280/166 |
| 7,163,221 B2 * | 1/2007 | Leitner ......................... | 280/166 |
| 7,287,771 B2 * | 10/2007 | Lee et al. ...................... | 280/166 |
| 7,318,596 B2 * | 1/2008 | Scheuring et al. ............ | 280/166 |
| 7,367,574 B2 * | 5/2008 | Leitner ......................... | 280/166 |
| 7,380,807 B2 * | 6/2008 | Leitner ......................... | 280/166 |
| 7,398,985 B2 * | 7/2008 | Leitner et al. ................. | 280/166 |
| 7,413,204 B2 * | 8/2008 | Leitner ......................... | 280/163 |
| 7,413,205 B2 * | 8/2008 | Watson ......................... | 280/166 |
| 7,441,790 B2 * | 10/2008 | Lechkun ....................... | 280/166 |
| 7,487,986 B2 * | 2/2009 | Leitner et al. ................. | 280/166 |
| 7,513,565 B2 * | 4/2009 | Watson ......................... | 296/199 |
| 7,566,064 B2 * | 7/2009 | Leitner et al. ................. | 280/166 |
| 7,584,975 B2 * | 9/2009 | Leitner ......................... | 280/166 |
| 7,594,672 B2 * | 9/2009 | Piotrowski .................... | 280/166 |
| 7,607,674 B2 * | 10/2009 | Watson ......................... | 280/166 |
| 7,621,546 B2 * | 11/2009 | Ross et al. ..................... | 280/166 |
| 7,673,892 B2 * | 3/2010 | Kuntze et al. ................. | 280/163 |
| 8,042,821 B2 * | 10/2011 | Yang et al. .................... | 280/166 |
| 8,052,162 B2 * | 11/2011 | Yang et al. .................... | 280/166 |
| 8,070,173 B2 * | 12/2011 | Watson ......................... | 280/166 |
| 8,136,826 B2 * | 3/2012 | Watson ......................... | 280/166 |

(Continued)

*Primary Examiner* — Jeffrey J Restifo

(74) *Attorney, Agent, or Firm* — Project CIP; Preston P. Frischknecht

(57) ABSTRACT

Rocker guards with automatic step are disclosed that provide robust protection from damage due to rock obstacles to rocker panels and also provide an automatic step to facilitate easy entry and exit from a lifted vehicle. Some embodiments of a rocker guard with automatic step for a vehicle (rocker) can include a body formed to protect rocker panels of a vehicle without damaging the rocker or a step located within the body when the step is in a retracted position, mounts attached to the body for attaching to a vehicle, and an actuator coupled to the step and the body, the actuator being configured to automatically lower the step out of the body to an extended position and retract the step to the retracted position.

21 Claims, 7 Drawing Sheets

(56) References Cited

U.S. PATENT DOCUMENTS

| | | | |
|---|---|---|---|
| 8,157,277 B2* | 4/2012 | Leitner et al. | 280/166 |
| 8,171,606 B2* | 5/2012 | Kuntze et al. | 29/11 |
| 2008/0116653 A1* | 5/2008 | Piotrowski | 280/166 |
| 2008/0191445 A1* | 8/2008 | Yang et al. | 280/166 |
| 2008/0238019 A1* | 10/2008 | Okada et al. | 280/166 |
| 2010/0044993 A1* | 2/2010 | Watson | 280/166 |
| 2010/0059962 A1* | 3/2010 | Leitner et al. | 280/166 |
| 2010/0194070 A1* | 8/2010 | Stauffer et al. | 280/166 |
| 2010/0320714 A1* | 12/2010 | Webb et al. | 280/166 |
| 2011/0233889 A1* | 9/2011 | Watson | 280/166 |
| 2012/0025485 A1* | 2/2012 | Yang et al. | 280/166 |
| 2012/0098231 A1* | 4/2012 | Huotari et al. | 280/166 |
| 2012/0139206 A1* | 6/2012 | May | 280/166 |
| 2012/0169024 A1* | 7/2012 | Verhee et al. | 280/166 |

* cited by examiner

ROBUST ROCKER GUARD WITH AUTOMATIC STEP

FIELD

This application relates generally to vehicle accessories, and particularly to accessories for sport utility vehicles and other off-road vehicles.

BACKGROUND

Off-road driving is growing in popularity. Places with off-road trails such as Moab, Utah have become very popular vacation destinations for people with off-road vehicles such as Jeeps®, SUVs, rock crawlers, trucks, and other off-road vehicles. Many thousands of off-roading destination miles invite those who want to get away from civilization. For example, tens of thousands of vehicles are driven on Moab's many off-road trails each year. Off-road destinations like Moab offer a variety of trails with varying difficulties. Some trails cannot be navigated without vehicle modifications to allow for greater grip, clearance, power, braking power, etc.

As such, many vehicles used off-road are modified to achieve greater off-road performance and to allow the vehicle to conquer and attempt difficult obstacles and trails. Some trails include rock obstacles that may come into contact with various parts of the underside of a vehicle. Running boards and rocker guards are often added to off-road vehicles to limit damage to rocker panels and other body panels by the rock obstacles. Another common modification is lifting the vehicle and adding larger wheels and tires to increase grip and clearance. Lifting the vehicle makes entering and exiting more difficult, requiring passengers to climb up into the vehicle with significant effort.

One solution to facilitating easy entry and exit from a lifted vehicle is an automatic step, such as the Powerstep offered by AMP research. However, such products are significantly more vulnerable to damage from contact with rock obstacles than fixed running boards and rocker guards, making it impractical to use vehicles equipped with automatic steps on more difficult off-road trails and obstacles, limiting the utility of the lifted vehicle. Such automatic steps also make it difficult or impossible to protect rocker panels with fixed running boards and rocker guards, lessening the off-road utility of vehicles equipped with automatic steps.

SUMMARY

Rocker guards with automatic step are disclosed that provide robust protection from damage due to rock obstacles to rocker panels and also provide an automatic step to facilitate easy entry and exit from a lifted vehicle. Some embodiments of a rocker guard with automatic step for a vehicle (rocker) can include a body formed to protect rocker panels of a vehicle, a step located within the body when the step is in a retracted position, mounts attached to the body for attaching to a vehicle, and an actuator coupled to the step and the body, the actuator being configured to automatically lower the step out of the body to an extended position and retract the step to the retracted position.

The guard can also include a dampener operably coupled to the body and the step. The dampener may be configured to hold at least a portion of the step in the retracted position. The guard can be a linear actuator such as a hydraulic actuator, pneumatic actuator, or any other suitable actuator. Guard 100 may also include door sensor 12, 14 configured to signal the step to automatically extend to the extended position when door sensor 12, 14 indicates an open door and automatically retract the step to the retracted position when the door sensor indicates a closed door.

The guard can also include at least two support legs coupling the step to the body. A tie rod operably connecting the at least two support legs to each other may be provided such that force applied to one support leg results in movement of each other support leg. Each of the at least two support legs may have a fixed length and be each rotationally coupled to the step and to the body. The at least two support legs can extend the step to the extended position by rotating about axis perpendicular to the length of the step.

A bottom surface of the step may be formed to provide a continuous surface appearance with the body when the step is in the retracted position. Each of the support legs may include a structural reinforcement to resist bending of the support legs when a load is placed on the step. The body and step may form the general shape of a rocker guard when the step is in the retracted position.

The guard may also include at least one attachment flange extending from the body along the entire length of the body and structural supports affixed to an inside surface of the body. The guard may be configured such that the rocker guard with automatic step can support the weight of a vehicle over a rock obstacle without damaging the functionality of the step.

BRIEF DESCRIPTION OF THE DRAWINGS

The following description can be better understood in light of Figures, in which.

Figure 1:
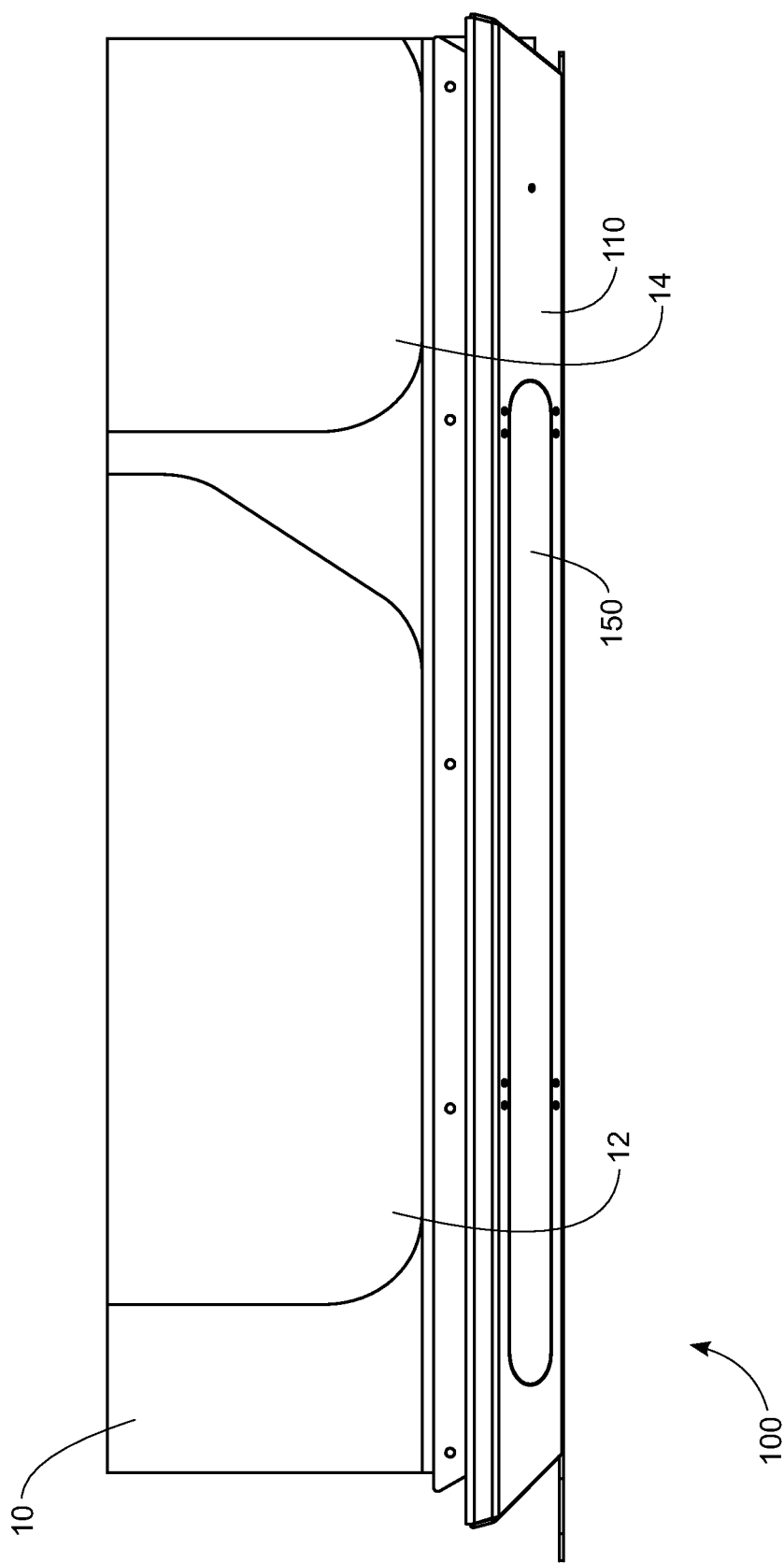
FIG. 1 is a drawing of an exemplary rocker guard with automatic step in a retracted position.
Figure 2:
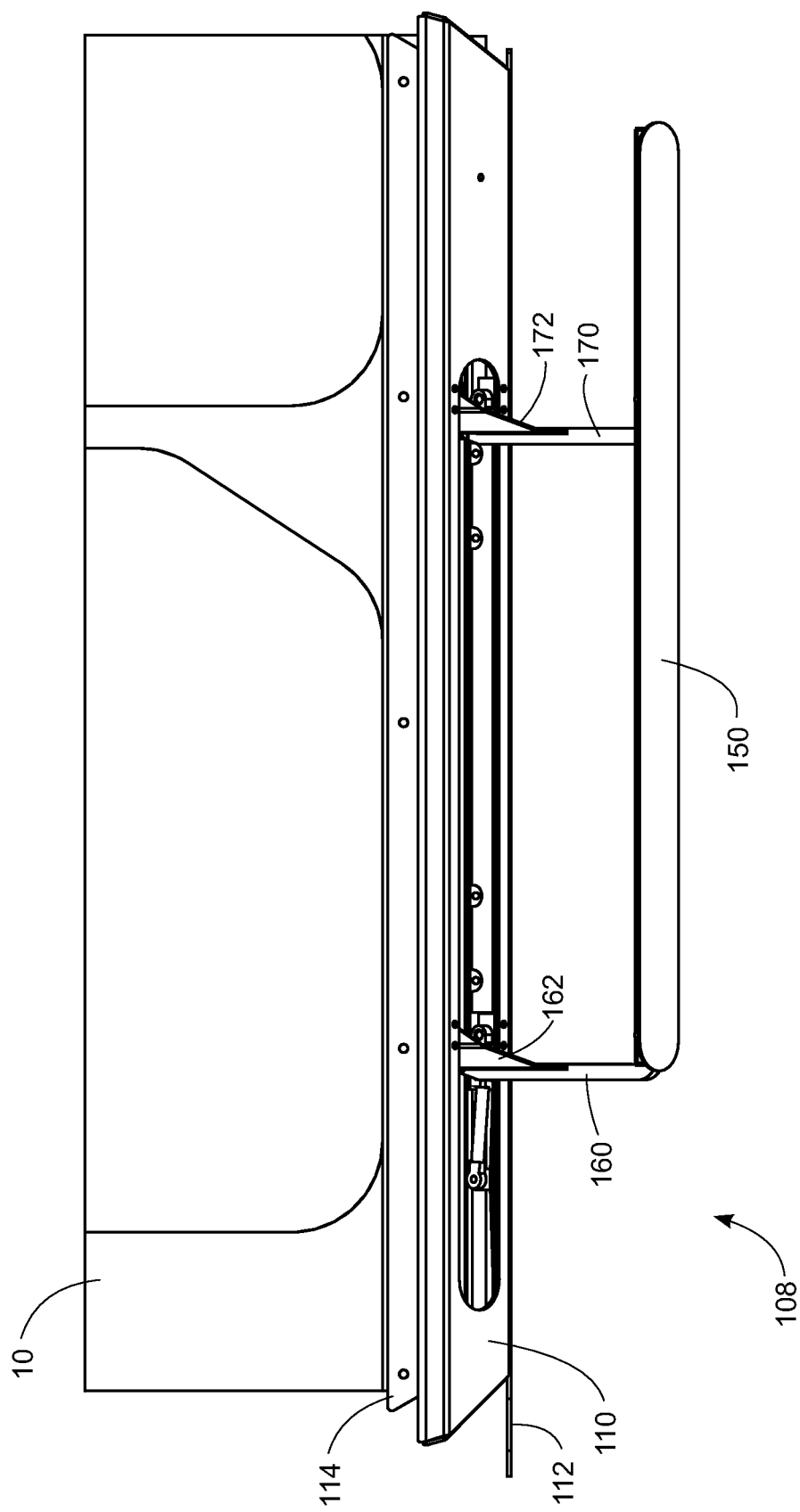
FIG. 2 is a drawing of an exemplary rocker guard with automatic step in an extended position.

Together with the following description, the Figures demonstrate and explain the principles of rocker guards with automatic step and methods for using and employing them. In the Figures, the size, number and configuration of components may be exaggerated for clarity. In some Figures, components have been omitted to allow for illustration of internal components. The same reference numerals in different Figures represent the same component.

DETAILED DESCRIPTION

The following description supplies specific details in order to provide a thorough understanding. Nevertheless, the skilled artisan would understand that embodiments of rocker guards with automatic step and associated methods of using them can be implemented and used without employing these specific details. Indeed, exemplary embodiments and associated methods can be placed into practice by modifying the illustrated units and associated methods and can be used in conjunction with any other devices and techniques conventionally used in the industry. For example, while the description below generally focuses on an embodiment with two support legs, more than two legs may be used for longer vehicles such as pickup trucks and large SUVs.

One exemplary embodiment of a rocker guard with automatic step (guard) 100 is illustrated in FIGS. 1-8. Guard 100 may include a body with a first integrally formed step (see FIGS. 7 & 3) 110, a second step 150, and support legs 160, 170. Guard 100 can be attached to vehicle 10 with mounts 112 and 114. Each of mounts 112, 114 may be formed as part of body 110, or may be attached to body 110 by welding or other fastening methods. Mounts 112 and 114 may extend along generally the entire length of body 110 to provide multiple attachment points to attach guard 100 to vehicle 10.

Additionally, mounts 112, 114 may extend from body 110 to provide additional structural support to resist bending. Mounts 112, 114 along with body 110 may also provide additional structural support to a frame of vehicle 10 with multiple attachment points, or continuous attachment when welded to the frame, by effectively increasing the maximum dimensions for loading of the frame or body where guard is attached. Vehicle 10 can thereby gain frame stiffness, improving off-road capability and potentially reducing the advent of stress and fatigue failure in various parts of vehicle 10.

Figure 6:
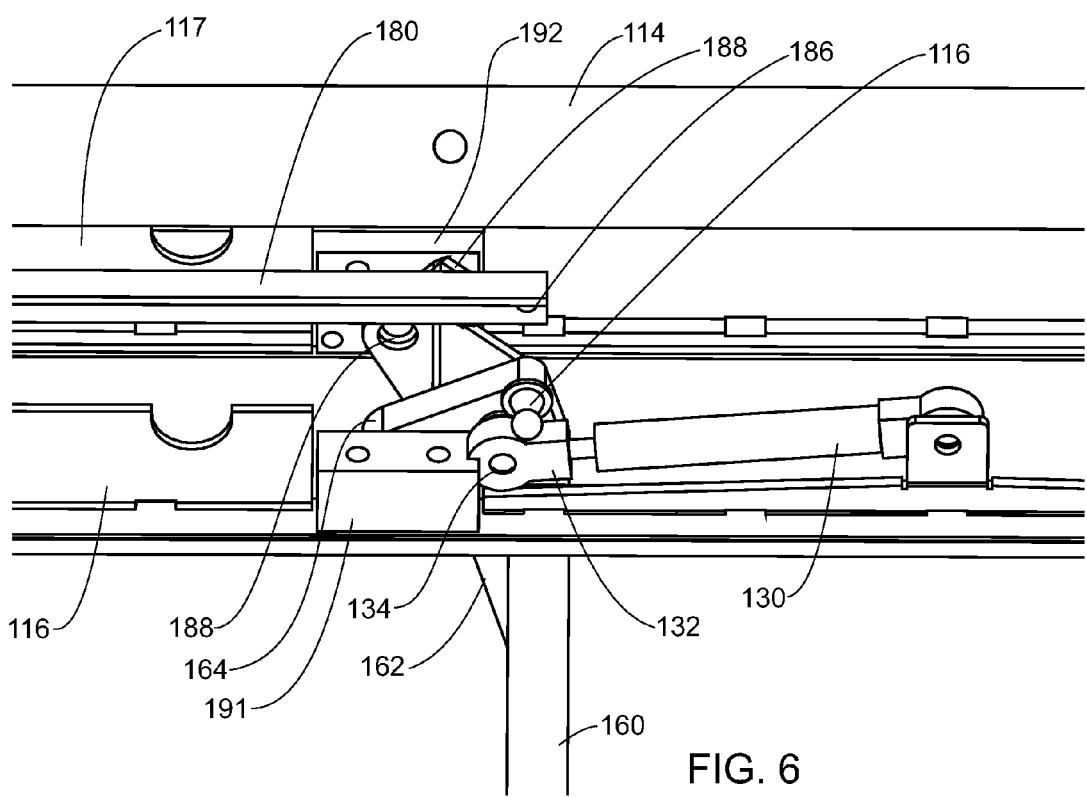
FIG. 6 is a close up view with partial cut-away of a portion of the rocker guard with automatic step of FIG. 2.
Figure 7:
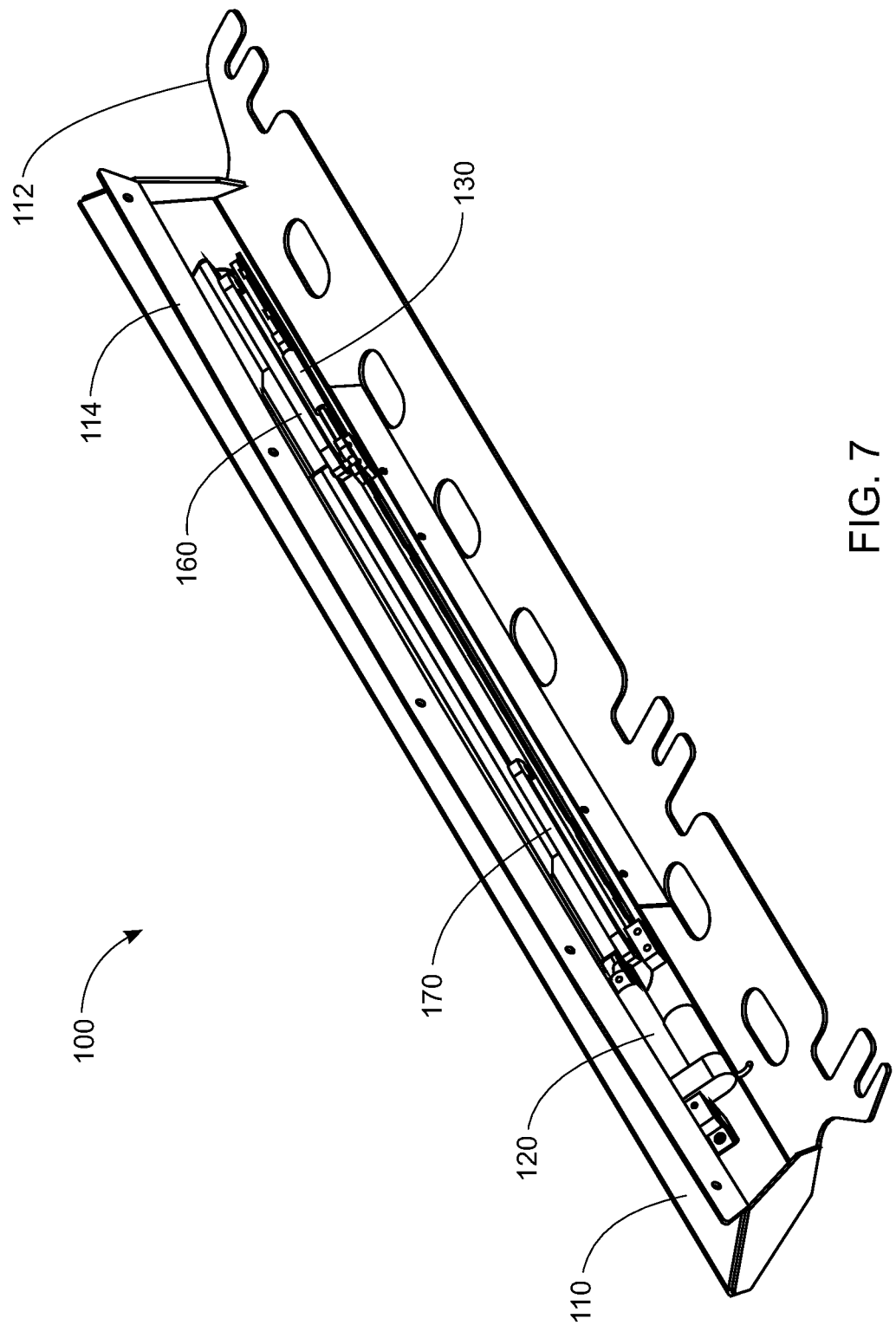
FIG. 7 is a rear perspective view with partial cut-away of the rocker guard with automatic step of FIG. 1.
Figure 8:
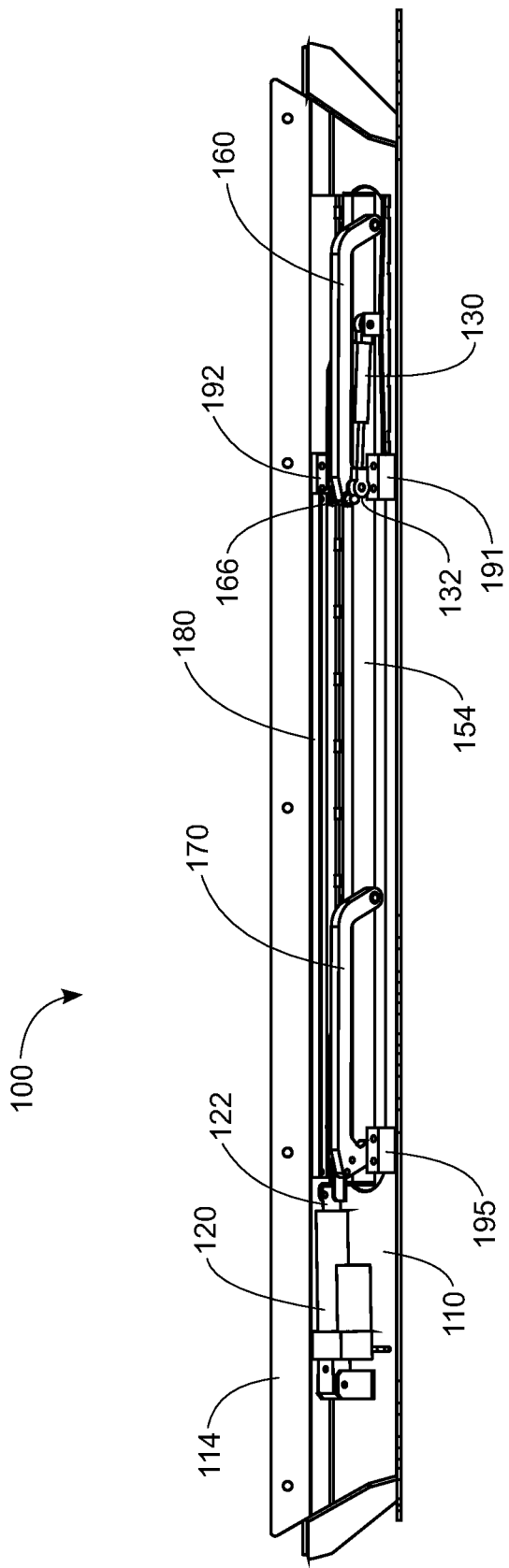
FIG. 8 is a rear view with partial cut-away of the rocker guard with automatic step of FIG. 1.

Step 150 may include bottom plate 152 and step member 154. Step 150 may be pivotably attached to support legs 160, 170 by pins 156, 158 respectively, allowing step 150 to remain parallel with body 110 as support legs 160, 170 extend between a retracted position, such as is shown in FIGS. 1, 7, and 8, and an extended position as shown in FIGS. 2-6. Step 150 may extend downwardly and laterally from body 110 and vehicle 10 to provide a step extended laterally from vehicle 10 to facilitate entry and exit of passengers. In some embodiments, step 150 can extend directly down. Similarly, step 150 may extend to any desired point by adjusting the length and angle of the various components, as will be apparent to one of ordinary skill. In various embodiments, step 150 is configured as a stirrup step, having front and back openings above and adjacent to step member 154.

Step member 154 may include a textured surface to provide slip resistant properties for people entering and exiting vehicle 10. The textured surface may be machined or otherwise formed into the step surface of step member 154, or may be in the form of grip tape, textured paint or adhesive, or any other slip resistant applied materials.

Bottom plate 152 may be formed such that a continuous surface is displayed with body 110 and step 150 when step 150 is fully retraced in the retracted position, such as shown in FIG. 1. As also shown in FIG. 1, in the fully retracted position, step 150 may be positioned entirely within body 110, with bottom plate showing to the exterior of body 110. In some embodiments, Bottom plate 152 may be the entire visible portion, or some portion of body 110 such that it appears that all or a significant portion of guard 100 lowers to be step 150 when extended. For example, step 150 may include the bottom exterior half of guard 100 as seen from outside of vehicle 10.

Step 150 can be extended and retracted by actuator 120. Actuator 120 may be a linear actuator such as a pneumatic or hydraulic cylinder and rod 122. In some embodiments, an electric motor, solenoid, or other type of actuator may be used as desired. Of course, any of several actuator types may be used to extend and retract step 150. In the illustrated embodiments, actuator 120 is pivotably mounted to body 110, with rod 122 attached to structural reinforcement 172.

Support leg 170, and similarly support leg 160, may be formed with a fixed length and from a single piece of material. Support leg may be formed from steel, aluminum, carbon fiber, or any other suitable material. Support leg 170 can be rotatably attached to block 193. Support leg 170 may rotate about pin 176, which holds leg 170 to block 194. Block 194 may be attached to body 110. Pin 176 may be oriented perpendicular to the length of body 110 to allow step 150 to rotate away from body 110.

Structural reinforcement 172 may provide additional support to resist bending and deflection of support leg 170. Support reinforcement 172 may be attached to support leg 170 and block 193. Support reinforcement may be welded or otherwise affixed to support leg 170 and pivotably attached to block 193 through pin 184. Pin 184 and pin 176 may share a common axis to allow support leg 170 and support reinforcement 172 to rotate as a single unit about a single axis. Block 193 may be attached to body 110.

Rod 122 may be attached to carrier 124 by pin 126. Carrier 124 may be pivotably attached to support leg 170 by pin 128. The axis of pin 128 can be offset from the axis of pin 176 such that when rod 122 is travels in and out of actuator 120, support leg 170 rotates about pins 176 and 184.

Tie rod 180 may connect leg 170 to leg 160 through support reinforcement 162, which is connected to support leg 160 similar to the connection of support reinforcement 172 and support leg 170 as described above. Support leg 160 may be pivotably attached to block 191 by pin 164, and support reinforcement 162 may be pivotably attached to block 192 by pin 188, similar to the connection arrangement of blocks 193 and 194, pins 176, 184, support leg 170, and support reinforcement 172 described above. Tie rod 180 may transfer force from actuator 120 to support leg 160 such that support leg 160 and support leg 170 rotate in unison when actuator 120 is activated.

Figure 3:
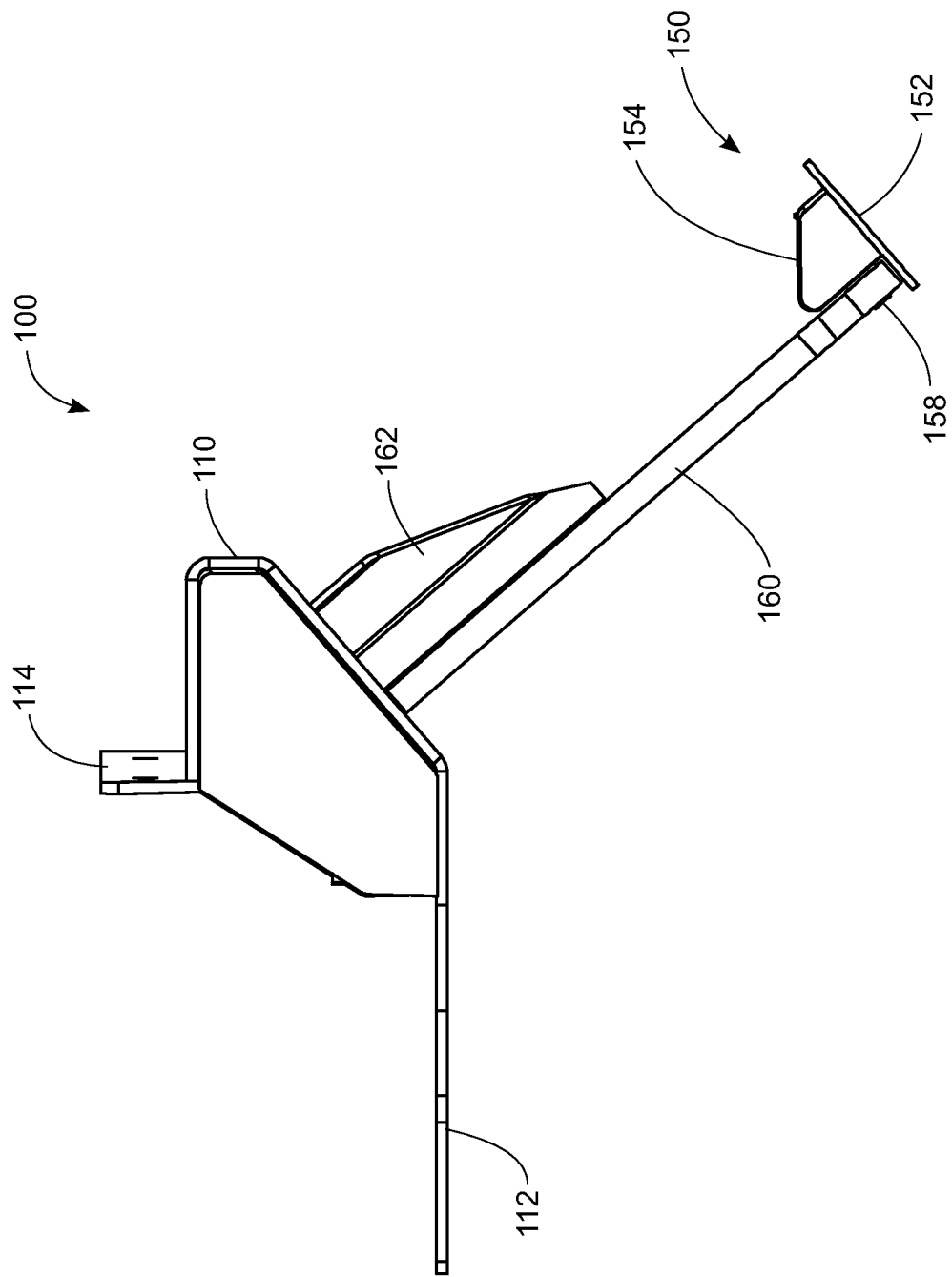
FIG. 3 is a side view of the rocker guard with automatic step of FIG. 2.
Figure 4:
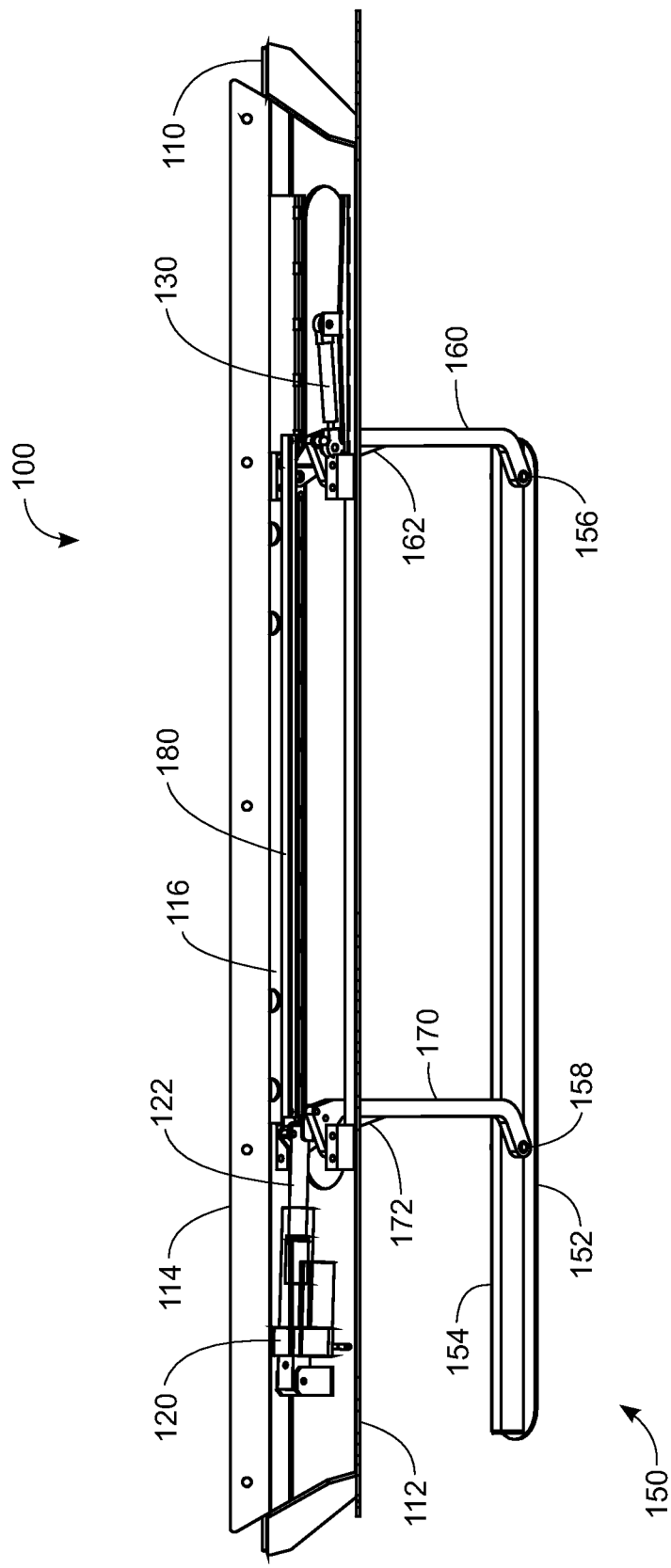
FIG. 4 is a back view with partial cut-away of the rocker guard with automatic step of FIG. 2.
Figure 5:
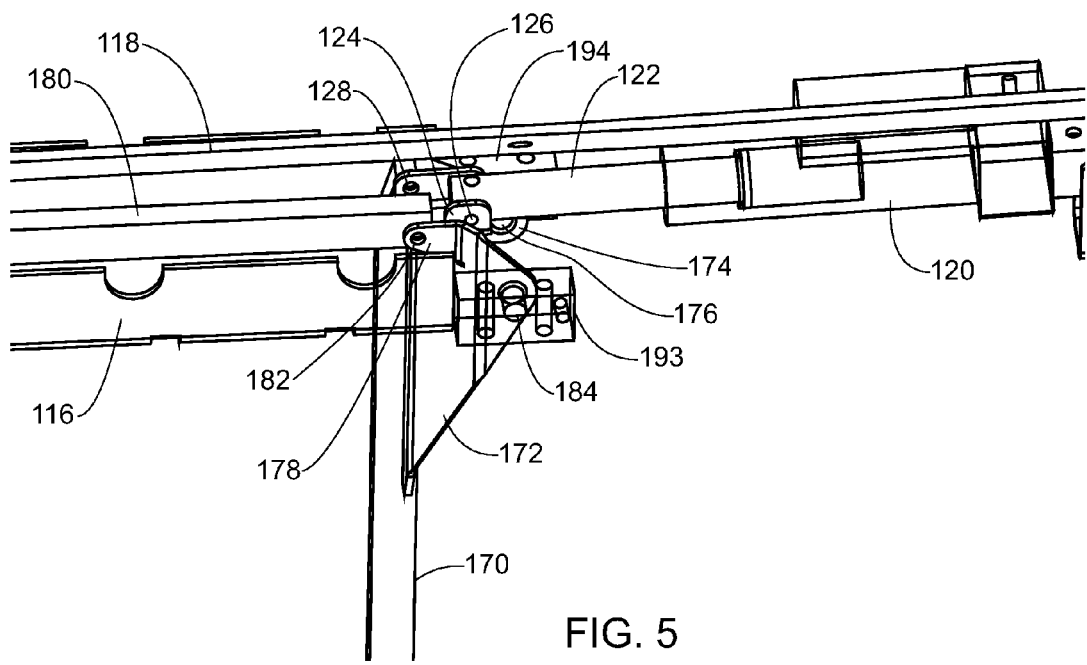
FIG. 5 is close-up view with partial cut-away of a portion of the rocker guard with automatic step of FIG. 2.

As best shown in FIGS. 1, 3, and 7, body 110 is formed to encase and protect the means for operating the automatic step and the step's functionality when the body is attached to a vehicle. So, configured, the step and its components are protected from impact with obstacles such as rocks.

Dampener 130 may be attached between body 110 and support leg 160 to smooth operation of the retraction and extension of step 150. Dampener 130 may be pivotably attached to support leg 160 through connector end 132 and pin 134. As best shown in FIG. 6, stop 166 may follow along an exterior contour of connector 132 such that when step 150 is fully extended to the extended position, stop 166 cannot travel further, providing a fixed travel limit for leg 160 and, thereby, to step 150. Dampener 130 may provide additional force to hold leg 160 in a fully retracted position to maintain step 150 in the retracted position.

Additional reinforcement members such as reinforcements 117, 118 can be provided with guard 100 to provide sufficient structural support to allow guard sufficient strength to protect vehicle 10 from rock obstacles. Guard 100 may be sufficiently strong to support the weight of vehicle 10 on a rock obstacle without damaging vehicle 10 or disrupting the functionality of step 150. For example, on a difficult trail or obstacle, it may be necessary to for guard to slide along a rock or rock obstacle, supporting the weight of the vehicle on that side while the wheels on the opposite side move the vehicle along and past the obstacle.

The various components of guard 100 may be formed from any suitable material or combination of materials to achieve the structural and functional objectives as described above, such as steel, aluminum, carbon fiber, etc.

Of course, vehicle 10 may have a guard 100 on both the driver's and passenger's sides, with the components arranged to provide similar functioning on each side. Actuator 120 may be activated with at least one sensor for detecting when a door above guard 100 is opened or closed. For example, a vehicle with a front and rear door over guard 100 can have sensors in both doors that activate actuator to extend step 150 when either door is open and retract step 150 when both doors are closed. Similarly, the sensor may be located only in the front door. The sensors can be a switch, optical sensor, or any other switch or sensor suitable to determine whether or not a door is opened or closed. Similarly, the actuator may utilize sensors already installed in the doors of vehicle 10, such as are commonly provided in factory-built vehicles.

In addition to any previously indicated modification, numerous other variations and alternative arrangements can be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, mariner of operation and use can be made without departing from the principles and concepts set forth herein. Also, as used herein, examples are meant to be illustrative only and should not be construed to be limiting in any manner.

The invention claimed is:

1. A rocker guard with automatic step for a vehicle, the rocker guard with automatic step comprising:
    a body formed to protect rocker panels of a vehicle;
    a first step integrally formed on the outside of the body;
    a second step located within the body when the second step is in a retracted position, and further capable of extending to a position substantially below said body;
    mounts attached to the body for fixedly attaching the body to a vehicle; and
    an actuator coupled to the second step and the body, the actuator being configured to automatically lower the second step out of the body to an extended position and retract the second step to the retracted position.

2. The rocker guard with automatic step of claim 1, further comprising a dampener operably coupled to the body and the second step.

3. The rocker guard with automatic step of claim 2, wherein the dampener is configured to hold at least a portion of the second step in the retracted position.

4. The rocker guard with automatic step of claim 1, wherein the actuator is a linear actuator.

5. The rocker guard with automatic step of claim 4, wherein the actuator is a hydraulic actuator.

6. The rocker guard with automatic step of claim 4, wherein the actuator is a pneumatic actuator.

7. The rocker guard with automatic step of claim 1, further comprising a door sensor configured to signal the second step to automatically extend to the extended position with the door sensor indicates an open door and automatically retract the second step to the retracted position when the door sensor indicates a closed door.

8. The rocker guard with automatic step of claim 1, further comprising at least two support legs coupling the second step to the body.

9. The rocker guard with automatic step of claim 8, further comprising a tie rod operably connecting the at least two support legs to each other such that force applied to one support leg results in movement of each other support leg.

10. The rocker guard with automatic step of claim 9, wherein the actuator is a single actuator and wherein the second step is configured to be moved between the extended position and the retracted position by the actuator.

11. The rocker guard with automatic step of claim 8, wherein each of the at least two support legs have a fixed length and are each rotationally coupled to the second step and to the body.

12. The rocker guard with automatic step of claim 11, wherein the at least two support legs extend the second step to the extended position by rotating about axis perpendicular to the length of the step.

13. The rocker guard with automatic step of claim 8, wherein each of the support legs includes a structural reinforcement to resist bending of the support legs when a load is placed on the second step.

14. The rocker guard with automatic step of claim 1, wherein a bottom surface of the second step is formed to provide a continuous surface appearance with the body when the second step is in the retracted position.

15. The rocker guard with automatic step of claim 1, wherein the body and second step form the general shape of a rocker guard when the second step is in the retracted position.

16. The rocker guard with automatic step of claim 1, further comprising at least one attachment flange extending from the body along the entire length of the body.

17. The rocker guard with automatic step of claim 1, further comprising structural supports affixed to an inside surface of the body.

18. The rocker guard with automatic step of claim 1, wherein the rocker guard with automatic step is configured such that the rocker guard with automatic step can support the weight of a vehicle over a rock obstacle without damaging the functionality of the step.

19. The rocker guard with automatic step of claim 1, wherein the second step forms a stirrup step when extended.

20. The rocker guard with automatic step of claim 1, wherein the body forms a barrier to encase means for extending the second step when the second step is retracted.

21. A rocker guard with automatic step for a vehicle, the rocker guard with automatic step comprising:
    a body formed to protect rocker panels of a vehicle, the body having a first step integrally formed on the outside of the body and a plurality of integrally formed mounts for fixedly attaching the body to a vehicle, the body further being formed as a barrier to encase automatic step means;
    a second step located within the body when the second step is in a retracted position, and further capable of extending to a position substantially below said body; and
    an actuator coupled to the second step and the body, the actuator being configured to automatically lower the second step out of the body to an extended position and retract the second step to the retracted position.

* * * * *